(12) United States Patent
Wei et al.

(10) Patent No.: US 8,425,140 B2
(45) Date of Patent: Apr. 23, 2013

(54) FASTENING DEVICE AND OBJECT HAVING THE SAME

(75) Inventors: Ren-Jing Wei, New Taipei (TW); Cheng-Hsiang Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 120 days.

(21) Appl. No.: 13/052,227

(22) Filed: Mar. 21, 2011

(65) Prior Publication Data
US 2011/0299921 A1 Dec. 8, 2011

(30) Foreign Application Priority Data
Jun. 8, 2010 (TW) .............................. 99118541 A

(51) Int. Cl.
*F16B 21/06* (2006.01)
(52) U.S. Cl.
USPC .......................................... 403/330; 403/321
(58) Field of Classification Search .................. 403/321, 403/322.1, 326, 328, 329, 330; 24/522; 312/223.2; 361/679.02, 679.55, 679.56, 679.58
See application file for complete search history.

(56) References Cited

U.S. PATENT DOCUMENTS

| | | | | |
|---|---|---|---|---|
| 4,912,602 A * | 3/1990 | Zurek et al. | .................... | 361/752 |
| 5,155,663 A | 10/1992 | Harase | | |
| 5,373,104 A * | 12/1994 | Brauer | ........................... | 174/562 |
| 5,706,672 A * | 1/1998 | Miyazaki | ....................... | 403/329 |
| 8,267,614 B2 * | 9/2012 | Khoe | .............................. | 403/329 |
| 2004/0190986 A1 * | 9/2004 | Hara et al. | .................... | 403/329 |
| 2005/0085129 A1 * | 4/2005 | Chiou et al. | .................. | 439/607 |

FOREIGN PATENT DOCUMENTS

TW 577675 2/2004

OTHER PUBLICATIONS

Taiwanese Office Action dated Dec. 21, 2012 issued in Taiwanese Patent Application No. 099118541 and Abridged English Translation, 11 pages.

* cited by examiner

*Primary Examiner* — Michael P Ferguson
(74) *Attorney, Agent, or Firm* — Nixon & Vanderhye P.C.

(57) ABSTRACT

A fastening device is adapted for fastening a first article to a second article, and includes a first hook, two positioning plates, and a second hook. The first hook is disposed on the first article. The positioning plates are disposed on the first article, and flank the first hook. Each of the positioning plates includes a positioning guide tack. The positioning guide track includes an upright slot portion, a curved guiding slot portion, and a stop shoulder. The curved guiding slot portion is located at a side of the upright slot portion distal from the first hook. The second hook includes an upright plate body disposed pivotally on the second article, a hook body engaging removably the first hook, and two guiding rods flanking the hook body. Each of the guiding rods includes a guiding stub engaging the stop shoulder.

16 Claims, 13 Drawing Sheets

FASTENING DEVICE AND OBJECT HAVING THE SAME

CROSS-REFERENCE TO RELATED APPLICATION

This application claims priority of Taiwanese Application No. 099118541, filed on Jun. 8, 2010.

BACKGROUND OF THE INVENTION

1. Field of the Invention

This invention relates to a fastening device and an object having the same, and more particularly to a non-threaded fastening device and an object having the same, the fastening device being convenient to assemble and disassemble quickly.

2. Description of the Related Art

Referring to FIGS. 1 and 2, a fastening device 1 disclosed in Taiwanese Patent No. M288756 (Application No. 094216081) is used to interconnect a first housing 21 and a second housing 22. The fastening device 1 includes two retaining hooks 11 disposed on the first housing 21 and spaced apart from each other in a left-to-right direction, and two retaining members 12 disposed on the second housing 22 and spaced apart from each other in the left-to-right direction. Each of the retaining hooks 11 has an arm 111 connected to the first housing 21, and a hook portion 112 disposed on a bottom end of the arm 111. The hook portions 111 extend respectively from the arms 111 in opposite direction. Each of the retaining members 12 has a retaining groove 121 engageable with the hook portion 112 of the corresponding retaining hook 11.

When it is desired to fasten the first housing 21 to the second housing 22, the retaining hooks 11 are pressed respectively toward the retaining members 12. When downwardly facing inclined surfaces 113 of the hook portions 112 come into contact with upwardly facing inclined surfaces 122 of the retaining members 12, the hook portions 112 and, thus, the arms 111 are pushed outwardly to thereby deform the arms 111. As soon as the hook portions 112 are aligned respectively with the retaining grooves 121, the former are biased into the latter due to the returning force of the deformed arms 111. Hence, the hook portions 112 abut respectively against stop walls 123 to thereby prevent removal of the first housing 21 from the second housing 22.

Since the arms 111 of the retaining hooks 11 are connected fixedly to the first housing 21, if a force is applied improperly to either of the retaining hooks 11 during assembly or disassembly of the fastening device 1, breakage may occur at the junction between the first housing 21 and the corresponding arm 111. Therefore, it is desirable to assemble and disassemble the fastening device quickly to prevent breakage of the fastening device.

SUMMARY OF THE INVENTION

An object of this invention is to provide a fastening device that is convenient to interconnect two articles quickly and that can be prevented from breakage during operation.

Another object of this invention is to provide an object that includes a fastening device, which is convenient to interconnect two articles quickly and which can be prevented from breakage during operation.

According to an aspect of this invention, there is provided a fastening device adapted to fasten a first article to a second article, the fastening device comprising:

a first hook adapted to be disposed on the first article;

two positioning plates adapted to be disposed on the first article and respectively located in front of and behind the first hook, each of the positioning plates including at least one positioning guide tack, the positioning guide track of each of the positioning plates including an upright slot portion having an open bottom end, a curved guiding slot portion having top and bottom ends in spatial communication with the upright slot portion and located at a side of the upright slot portion distal from the first hook, and a stop shoulder disposed between a top end of the upright slot portion and the top end of the curved guiding slot portion;

at least two fixed plates spaced apart from each other in a front-to-rear direction and adapted to be disposed on the second article; and at least one second hook including an upright plate body connected pivotally between the fixed plates, a hook body extending from a top end of the plate body and engaging removably the first hook, and two guiding rods extending from the top end of the plate body and spaced apart from and respectively located in front of and behind the hook body, each of the guiding rods including a guiding stub that extends from an upper end thereof, that abuts against the stop shoulder of the positioning guide track of a corresponding one of the positioning plates, and that is inserted into and guided by the upright slot portion of the positioning guide track of the corresponding one of the positioning plates to abut against the stop shoulder of the positioning guide track of the corresponding one of the positioning plates during assembly of a corresponding one of the guiding rods to the corresponding one of the positioning plates.

According to another aspect of this invention, there is provided an object comprising:

a first article;

a second article; and a fastening device for fastening the first article the second article, the fastening device including a first hook disposed on the first article, two positioning plates disposed on the first article and respectively located in front of and behind the first hook, each of the positioning plates including at least one positioning guide tack, the positioning guide track of each of the positioning plates including an upright slot portion having an open bottom end, a curved guiding slot portion having top and bottom ends in spatial communication with the upright slot portion and located at a side of the upright slot portion distal from the first hook, and a stop shoulder disposed between a top end of the upright slot portion and the top end of the curved guiding slot portion, at least two fixed plates spaced apart from each other in a front-to-rear direction and disposed on the second article, and at least one second hook including an upright plate body connected pivotally between the fixed plates, a hook body extending from a top end of the plate body and engaging removably the first hook, and two guiding rods extending from the top end of the plate body and spaced apart from and respectively located in front of and behind the hook body, each of the guiding rods including a guiding stub that extends from an upper end thereof, that abuts against the stop shoulder of the positioning guide track of a corresponding one of the positioning plates, and that is inserted into and guided by the upright slot portion of the positioning guide track of the corresponding one of the positioning plates to abut against the stop shoulder of the positioning guide track of the corresponding one of the positioning plates during assembly of a corresponding one of the guiding rods to the corresponding one of the positioning plates.

As such, to interconnect the first and second articles, it is only necessary to move the first and second articles toward each other. To separate the first and second articles from each other, it is only necessary to move the first and second articles away from each other. Thus, the object is convenient to assemble and disassemble quickly. Furthermore, when the first and second articles are separated from each other, the second hook portion can be prevented from obstruction of the first hook portion and, thus, breakage.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
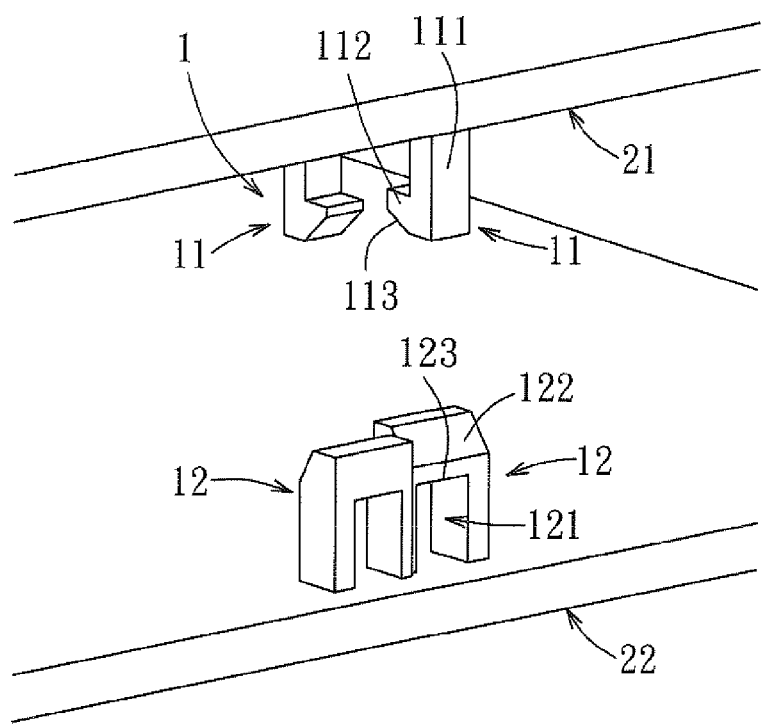
FIG. 1 is an exploded perspective view of a conventional fastening device disclosed in Taiwanese Patent No. M288756.
Figure 2:
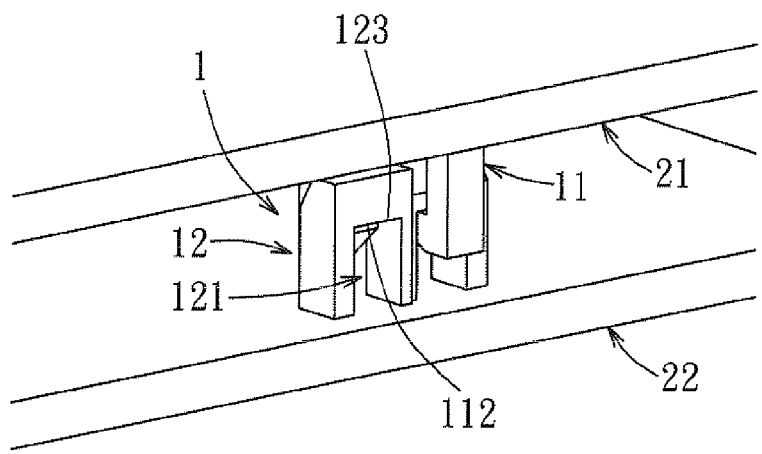
FIG. 2 is an assembled perspective view of the conventional fastening device.

Before the present invention is described in greater detail in connection with the preferred embodiments, it should be noted that similar elements and structures are designated by like reference numerals throughout the entire disclosure.

Figure 3:
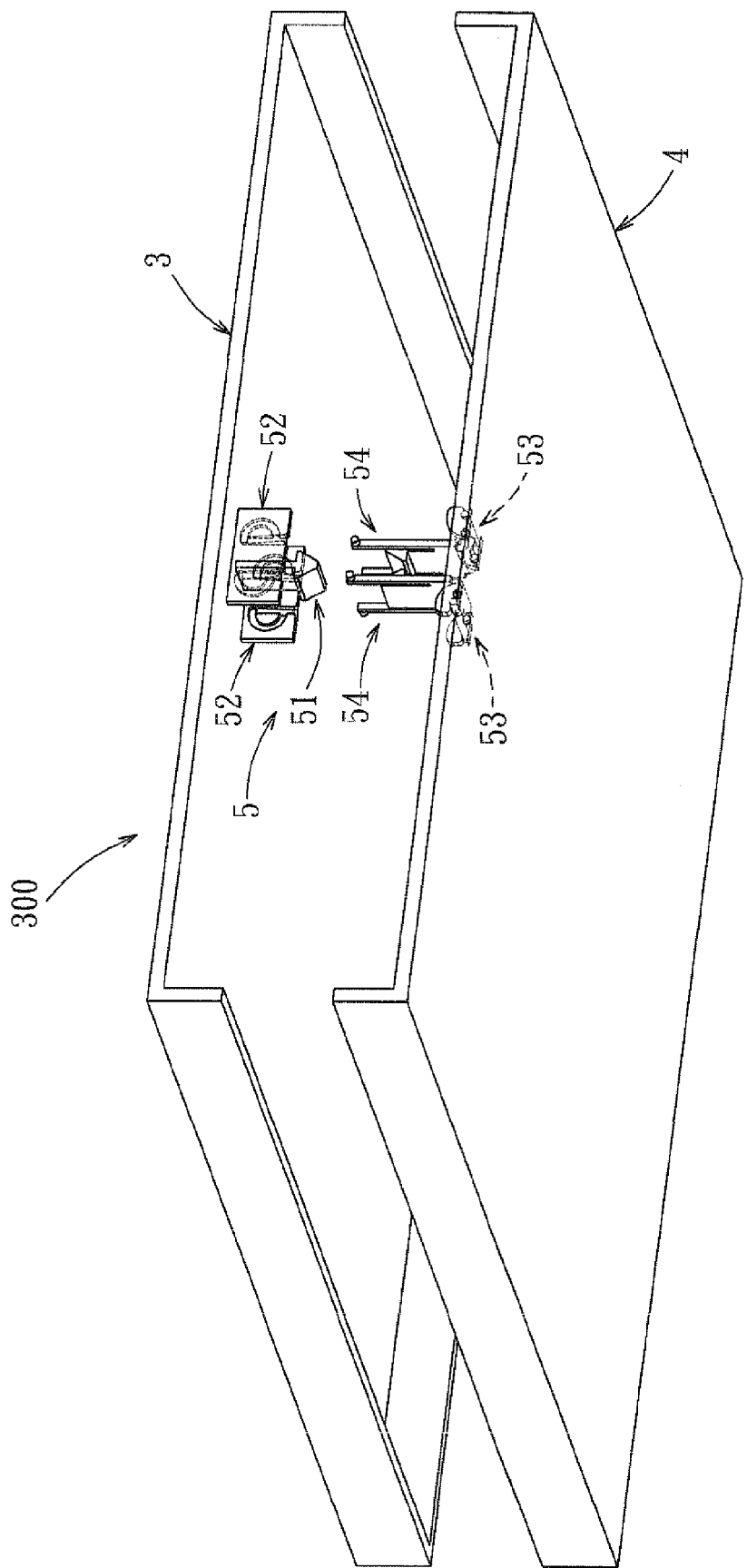
FIG. 3 is an exploded perspective view of the preferred embodiment of an object according to this invention.

Referring to FIG. 3, the first preferred embodiment of an object 300 according to this invention includes a first article 3, a second article 4, and a fastening device 5 interconnecting the first and second articles 3, 4. In this embodiment, the object 300 is exemplified using a mainframe housing of a notebook computer. The first article 3 is an upper housing portion. The second article 4 is a lower housing portion. Alternatively, the object 300 may be a planet computer, a personal digital assistant, a mobile phone, or any other similar product having two articles that are interconnected removably.

Figure 4:
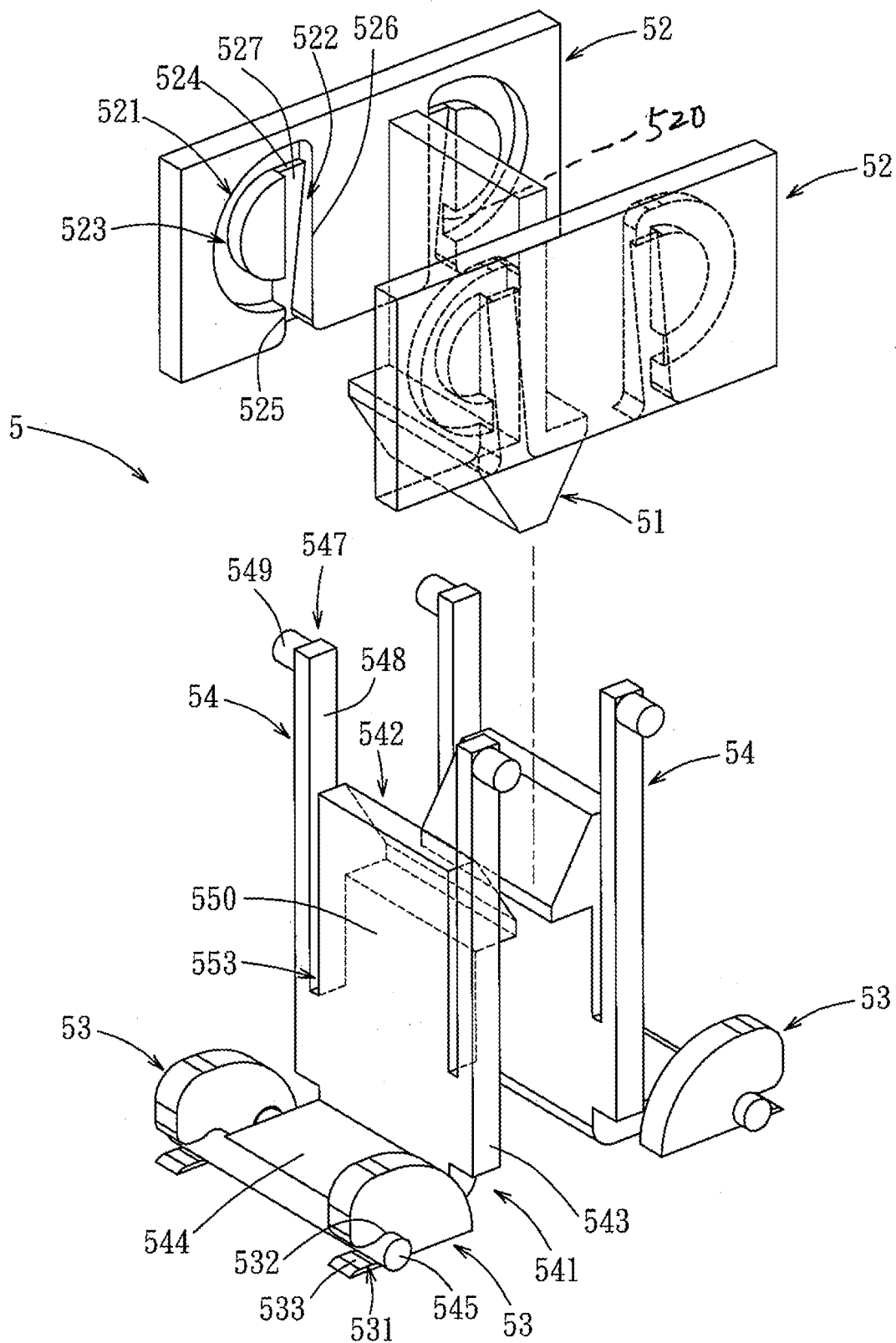
FIG. 4 is a partly exploded perspective view of a fastening device of the preferred embodiment.
Figure 5:
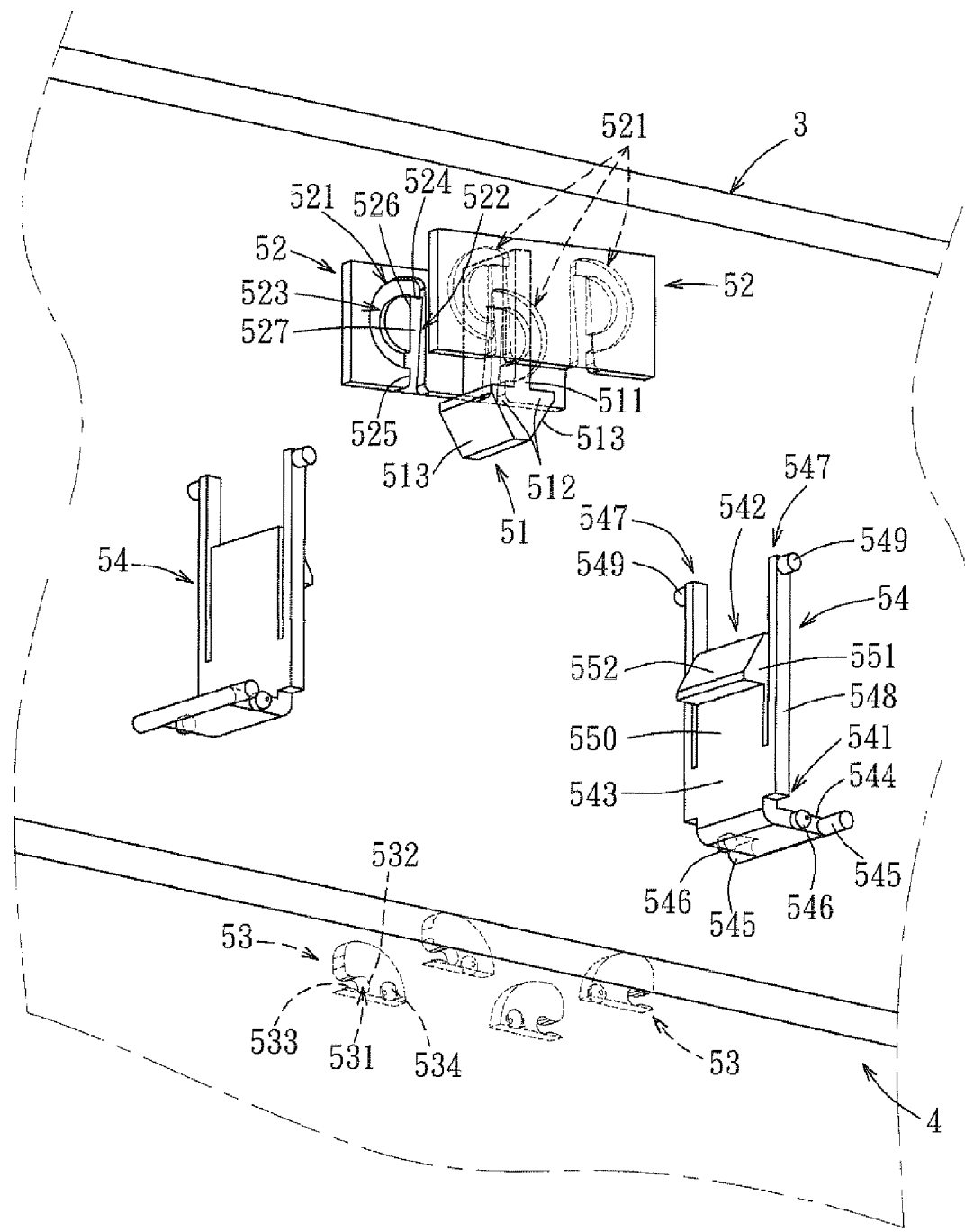
FIG. 5 is an exploded perspective view of the fastening device of the preferred embodiment.

With further reference to FIGS. 4 and 5, the fastening device 5 includes a first hook 51, two positioning plates 52, two pairs of fixed plates 53, and two second hooks 54. The first hook 51 is disposed on the first article 3. The two positioning plates 52 are disposed on the first article 3, and are respectively located in front of and behind the first hook 51 (i.e., flank the first hook 51). Each of the positioning plates 52 includes two positioning guide tracks 521 disposed at an inner side surface thereof and spaced apart from each other in a left-to-right direction. Each of the positioning guide tracks 521 includes an upright slot portion 522 having an open bottom end, a curved guiding slot portion 523 having top and bottom ends in spatial communication with the upright slot portion 522, a stop shoulder 524 disposed between a top end of the upright slot portion 522 and the top end of the curved guiding slot portion 523. Each of the curved guiding slot portions 523 is located at a side of the corresponding upright slot portion 522 distal from the first hook 51. Each pair of the fixed plates 53 are disposed on the second article 4, and are spaced apart from each other in a front-to-rear direction. Each of the second hooks 54 includes a plate body 541 disposed pivotally between the corresponding pair of the fixed plates 53, a hook body 542 extending from a top end of the plate body 541 and engaging removably the first hook 51.

The detailed structures, assembly, and disassembly of the above-mentioned components will be described in the following. The first hook 51 includes an arm 511 connected to the first article 3, and two first hook portions 512 projecting from a bottom end of the arm 511 and respectively located at left and right sides of the arm 511. The second hook bodies 542 extend respectively from the plate bodies 541 toward each other, and are spaced apart from each other in the left-to-right direction. Each of the plate bodies 541 includes an upright plate portion 543. The hook bodies 542 extend respectively from the upright plate portions 543 for engaging the first hook portions 512, respectively.

The plate body 541 of each of the second hooks 54 further includes a horizontal stop plate portion 544 extending from a bottom end of the upright plate portion 543 and abutting against the second article 4. Each of the fixed plates 53 is connected integrally to the second article 4, and includes a pivot groove 531. Each of the second hooks 54 further includes two pivot shafts 545 extending respectively from front and rear sides of the stop plate portion 544 and received respectively and rotatably within the pivot grooves 531 in the corresponding pair of the fixed plates 53, so that the corresponding second hook 54 is rotatable about the pivot shafts 545 relative to the corresponding pair of the fixed plates 53. Since the stop plate portions 544 abut against the second article 4, the rotational directions of the second hooks 54 are limited, and the contact area between the second hooks 54 and the second article 4 is increased to thereby position effectively the second hooks 54 relative to the second article 4. In this embodiment, the pivot groove 531 of each of the fixed plates 53 has a curved pivoting groove portion 532 that permits the corresponding pivot shaft 545 to be received therein, and a guiding groove portion 533 that is open in the left-to-right direction for guiding the corresponding pivot shaft 545 into the pivoting groove portion 532 during the assembly of the object 300. As such, each of the second hooks 54 can be mounted conveniently and quickly between the corresponding pair of the fixed plates 53.

Figure 6:
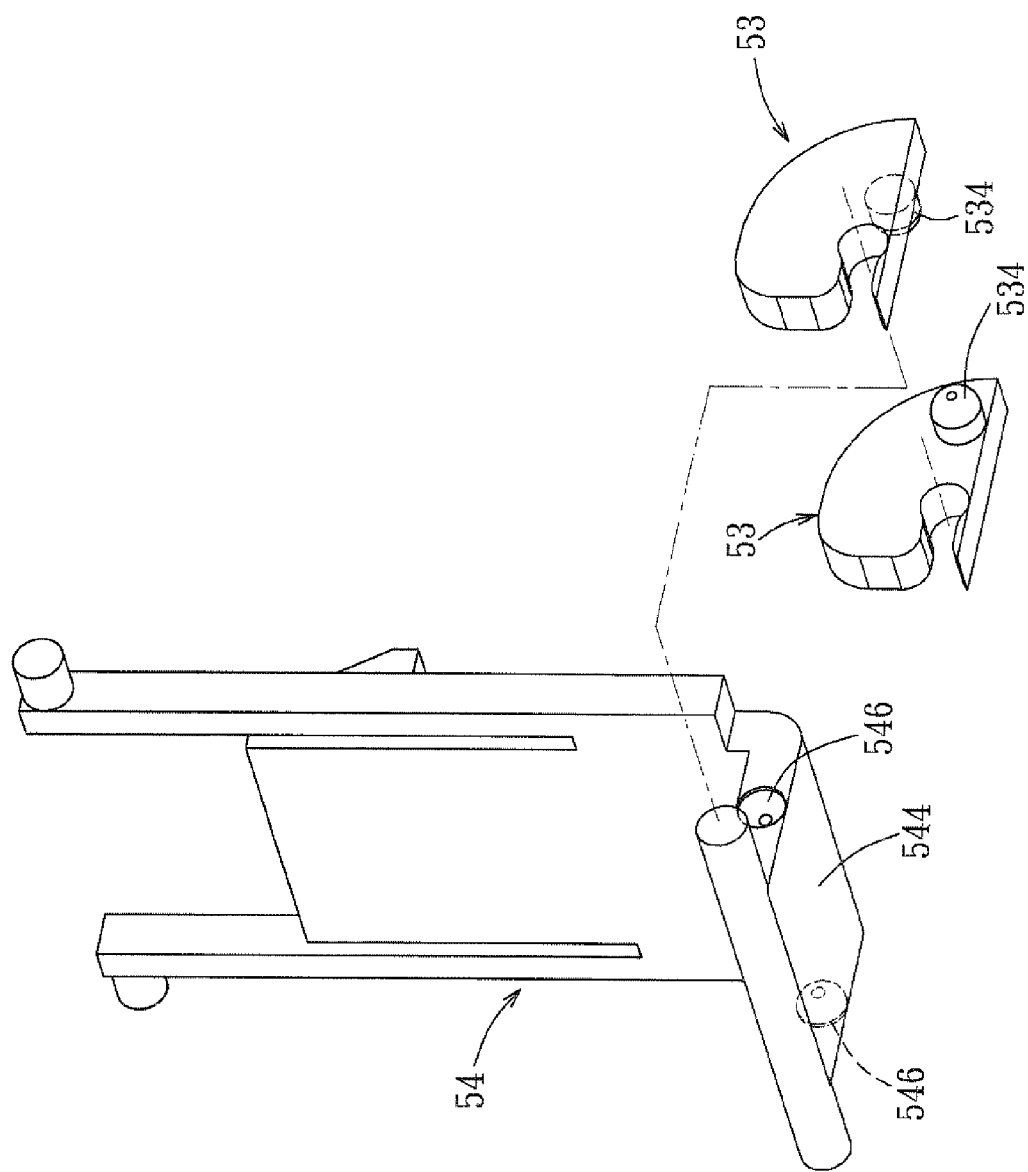
FIG. 6 is an exploded perspective view illustrating a modified second hook and two modified fixed plates of the fastening device of the preferred embodiment.

Each of the fixed plates 53 further includes a first positioning portion 534 disposed at an inner side surface thereof and spaced apart from and adjacent to the pivoting groove portion 532, such that the pivoting groove portion 532 is disposed between the guiding groove portion 533 and the first positioning portion 534. Each of the second hooks 54 further includes two second positioning portions 546 disposed respectively at front and rear sides thereof. In this embodiment, each of the first positioning portions 534 is configured as a circular groove, and each of the second positioning portions 546 is configured as a cylindrical tongue. The first positioning portions 534 engage respectively the second positioning portions 546 so as to prevent rotation of the second hooks 54 relative to the fixed plates 53 and, thus, removal of the hook bodies 542 from the first hook portions 512 of the first hook 51, thereby maintaining the hook bodies 542 at upright positions. Of course, in design, the first positioning portions 534 may be cylindrical tongues, and the second positioning portions 546 may be circular grooves, as shown in FIG. 6.

To allow the hook bodies 542 of the second hooks 54 to engage respectively and stably the first hook portions 512 of the first hook 51 to prevent forward or rearward removal of the hook bodies 542 from the first hook portions 512, the two positioning plates 52 of the fastening device 5 are connected integrally to the first article 3, and are respectively located in front of and behind the first hook 51. In addition, each of the second hooks 54 further includes two guiding rods 547 extending from the upright plate portion 543 of the plate body 541 and spaced apart from and respectively located in front of and behind the hook body 542 (i.e., flanking the hook body 542). The guiding rods 547 abut respectively against the inner side surfaces of the positioning plates 52 to thereby prevent forward and rear movement of the second hooks 54 relative to the first hook 51 and, thus, forward and rearward removal of the hook bodies 542 from the first hook portions 512, respectively.

Each of the guiding rods 547 includes a rod body 548 connected to the top end of the corresponding upright plate portion 543, and a guiding stub 549 extending perpendicularly from an outer side surface of the rod body 549 and movable along the corresponding positioning guide track 521. Each of the hook bodies 542 includes an arm 550 extending from the top end of the upright plate body 543, and a second hook portion 551 extending from a top end of the arm 550 and engaging the corresponding first hook portion 512. The guiding stub 549 of each of the guiding rods 547 is above the second hook portion 551 of the corresponding hook bodies 542. During assembly of the first and second articles 3, 4, the guiding stubs 549 of the guiding rods 547 are moved respectively and upwardly into upright slot portions 522 of the positioning guiding tracks 521 through open bottom ends of the upright slot portions 522. When the guiding stubs 549 are moved respectively and upwardly along the upright slot portions 522, since the second positioning portions 546 engage respectively the first positioning portions 534 so that rotation of the second hooks 54 relative to the fixed plates 53 can be prevented, engagement of the second hook portions 551 of the hook bodies 542 with the first hook portions 512 of the first hook 51 is ensured.

When the guiding stubs 549 of the guiding rods 547 are guided by the upright slot portions 522 to abut respectively against the stop shoulders 524, the second hook portions 551 of the hook bodies 542 engage respectively the first hook portions 512 of the first hook 51. Subsequently, when the first article 3 is removed from the second article 4, since the guiding stubs 549 are obstructed by the stop shoulders 542 from moving downwardly into the upright slot portions 522, they move along the curved guiding slot portions 523, respectively. At initial stage of movement of the guiding stubs 549 along the curved guiding slot portions 523, since each of the curved guiding slot portions 523 is located at a side of the corresponding upright slot portion 522 distal from the first hook 51 (i.e., outer side of the corresponding upright slot portion 522), the guiding stubs 549 of each of the second hooks 54 are moved respectively away from those of the other of the second hooks 54. Hence, the second positioning portions 546 are removed from the first positioning portions 534 to allow the second hooks 54 to pivot away from each other to thereby separate from the first hook portions 512. When each of the guiding stubs 549 moves past the outermost position of the corresponding curved guiding slot portion 523 distal from the corresponding upright slot portion 522 (i.e., the middle position of the corresponding curved guiding slot portion 523), the guiding stubs 549 of each of the second hooks 54 are moved respectively toward those of the other of the second hooks 54 to engage the second positioning portions 546 with the first positioning portions 534, respectively. As a consequence, when the guiding stubs 549 are removed respectively from the upright slot portions 522, each of the second hooks 54 returns to its original position (as shown in FIG. 5).

Through the design of the curved guiding slot portions 523, when the first and second articles 3, 4 are disconnected from each other, the second hook portions 551 cannot be obstructed by the first hook portions 512. In other words, the first hook portions 512 can be removed easily from the second hook portions 551 without the risk of breaking the arms 550. Thus, the first and second articles 3, 4 can be separated conveniently and quickly from each other.

In this embodiment, each of the upright slot portions 522 includes a main slot section 525 that is open at a bottom end thereof and that is in spatial communication with the bottom end of the corresponding curved guiding slot portion 523, and a guiding slot section 526 that extends upwardly from a top end of the main slot section 525 and that has a top end in spatial communication with the top end of the corresponding curved guiding slot portion 523. For each of the positioning guide tracks 521, since the main slot section 525 has a depth greater than that of the curved guiding slot portion 523 at the junction between the main slot section 525 and the curved guiding slot portion 523 such that a stop wall surface 520 (see FIG. 4) is defined between the bottom end of the curved guiding slot portion 523 and the main slot section 525, during assembly of the first and second articles 3, 4, the corresponding guiding stub 549 is guided by the main slot section 525 to move through the guiding slot section 526 to thereby abut against the corresponding stop shoulder 524. Consequently, undesired movement of the corresponding guiding stub 549 from the upright slot portion 522 into the curved guiding slot portion 523 can be prevented.

Figure 7:
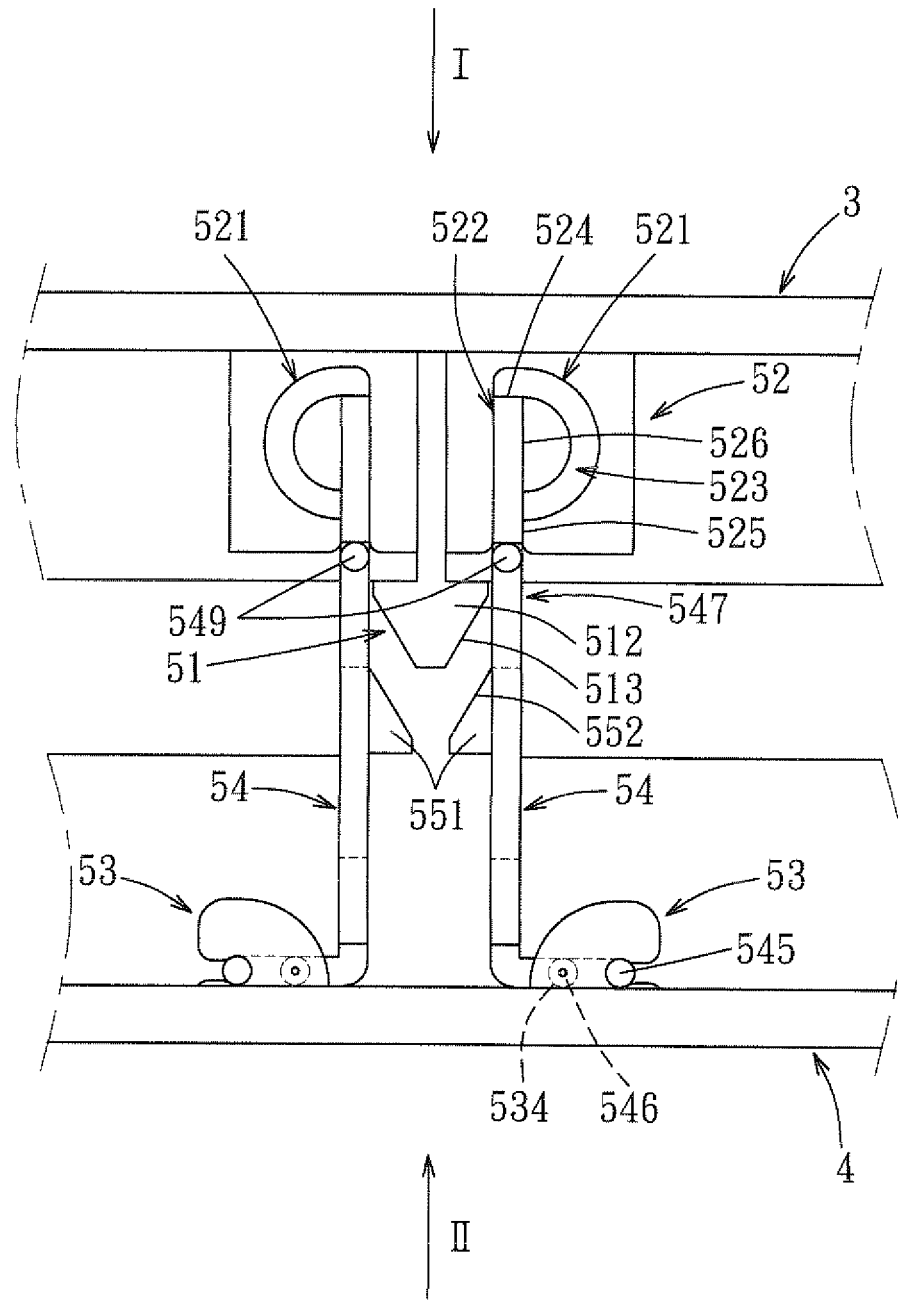
FIG. 7 is a fragmentary schematic view of the fastening device of the preferred embodiment, illustrating that two guiding stubs are inserted respectively into main slot sections in two positioning guide tracks during assembly of the fastening device.

When it is desired to interconnect the first and second articles 3, 4, the two first hook portions 512 are first aligned respectively with the second hook portions 551 of the two second hooks 54. Next, the first article 3 is pressed downwardly in a first direction (I), and/or the second article 4 is pressed upwardly in a second direction (II), as shown in FIG. 7, so as to move the first and second articles 3, 4 toward each other. Since the guiding stubs 549 of the guiding rods 547 are above the second hook portions 551 of the hook bodies 542, when the guiding stubs 549 are moved into the main slot sections 525 of the upright slot sections 522, respectively, the second hook portions 551 of the hook bodies 542 are brought into alignment with the first hook portions 512, respectively.

Figure 8:
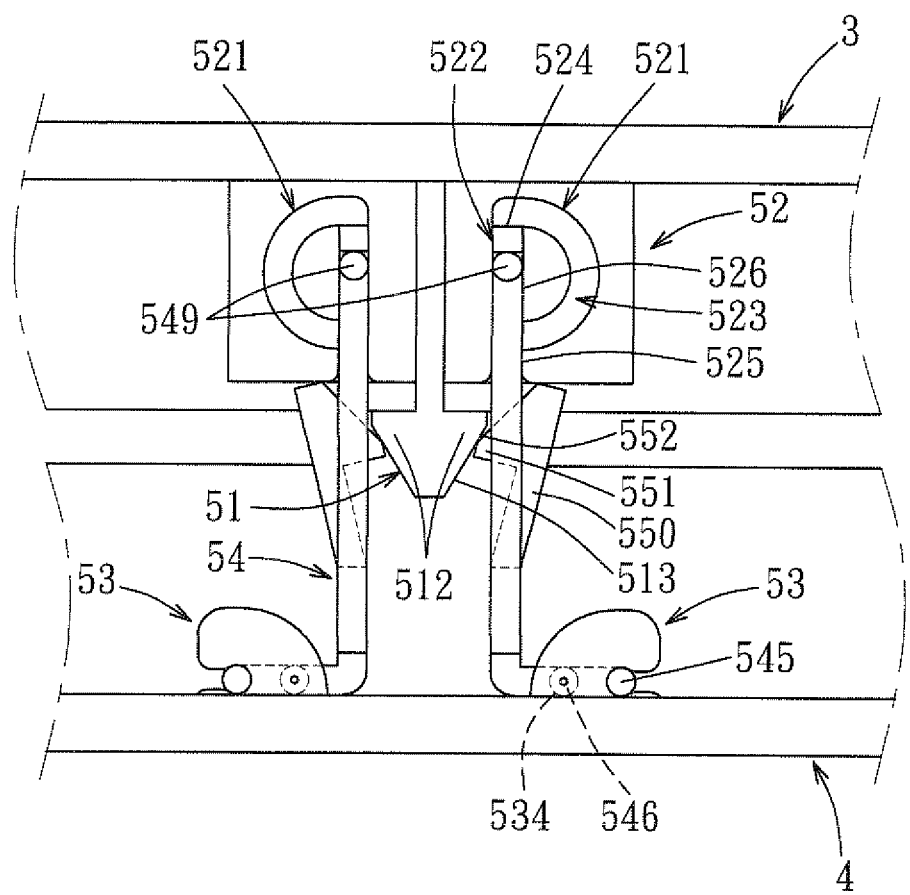
FIG. 8 is a fragmentary schematic view of the fastening device of the preferred embodiment, illustrating that two second hook portions are pushed respectively and outwardly by two first hook portions during assembly of the fastening device.
Figure 9:
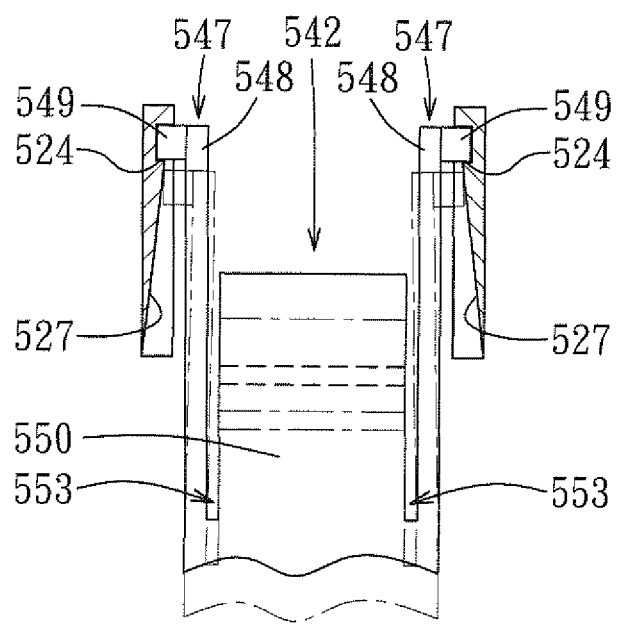
FIG. 9 is a fragmentary schematic view of the fastening device of the preferred embodiment, illustrating that the guiding stubs slide respectively on two inclined bottom wall surfaces during assembly of the fastening device and during movement thereof along two upright slot portions.

With particular reference to FIG. 7, when an upwardly facing inclined contact surface 552 of each of the second hock portions 551 comes into contact with a downwardly facing inclined guiding surface 513 of the corresponding first hook portion 512, the corresponding first hook portion 512 applies a force to push the corresponding second hook portion 512 outwardly to thereby deform the corresponding arm 550, as shown in FIG. 8. Since a clearance 553 is formed between the hook body 542 and each of the guiding rods 547 of each of the second hooks 54, when the corresponding arm 550 deforms, it cannot contact the guiding rods 547. With particular reference to FIGS. 4 and 9, each of the upright slot portions 522 of the positioning guide tracks 521 is defined by an inclined bottom wall surface 527 that is inclined upwardly and inwardly toward the first hook 51 and that permits the corresponding guiding stub 549 to move thereon. When the corresponding stub 549 moves along the corresponding inclined bottom wall surface 527, the corresponding rod body 548 flexes toward the corresponding hook body 542, as shown in FIG. 9. Due to the presence of the corresponding clearance 553, when the corresponding arm 548 deforms, it cannot contact the corresponding hook body 542.

Figure 10:
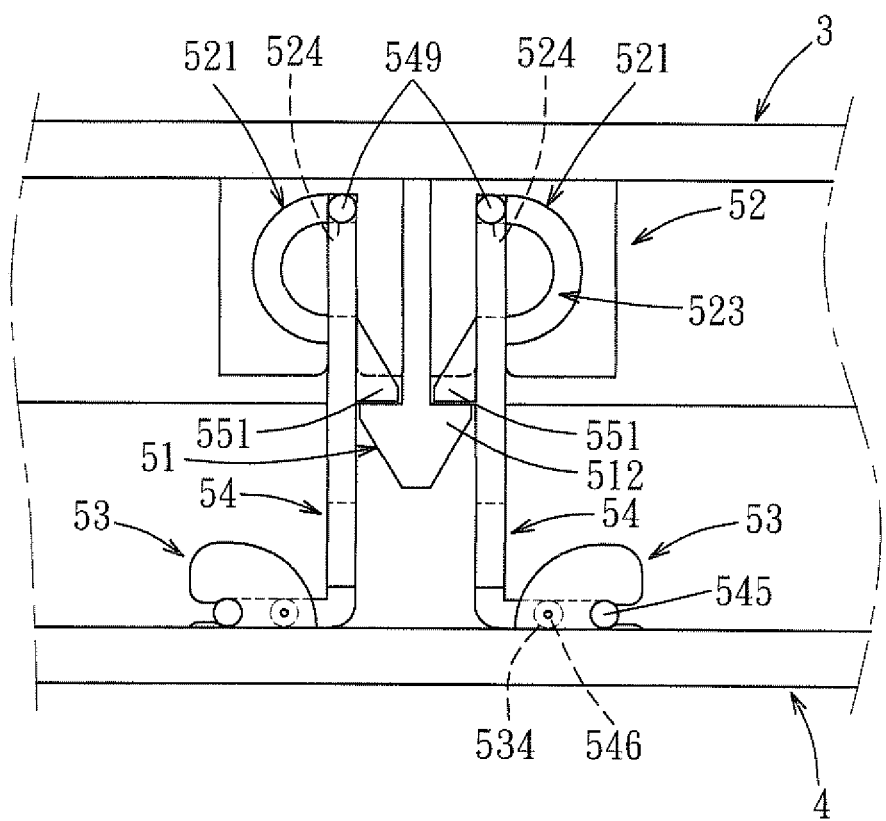
FIG. 10 is a fragmentary schematic view of the fastening device of the preferred embodiment, illustrating that the guiding stubs abut respectively against two stop shoulders and the second hook portions engage respectively the first hook portions during assembly of the fastening device.
Figure 11:
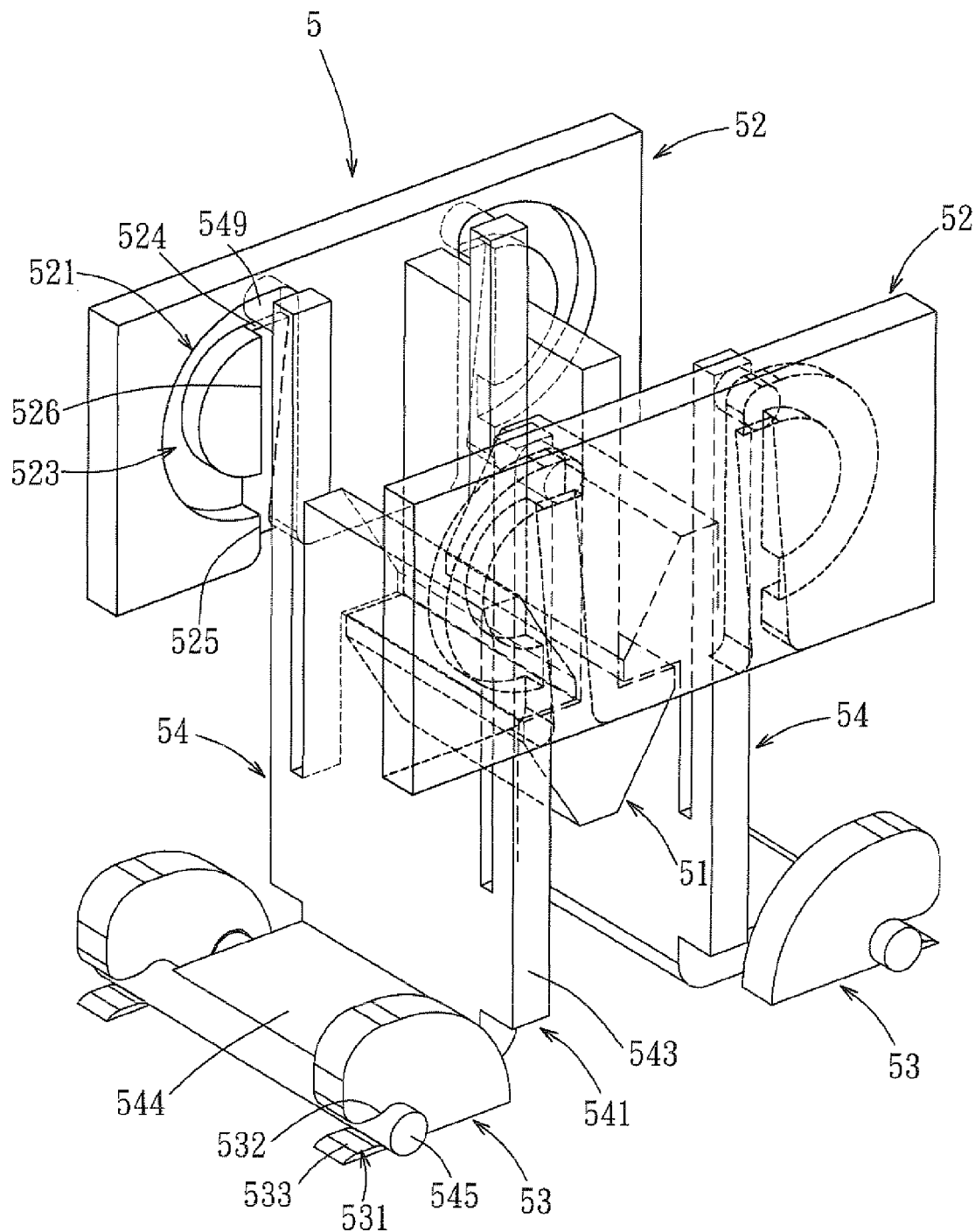
FIG. 11 is a perspective view of the fastening device of the preferred embodiment, illustrating that the guiding stubs abut respectively against the two stop shoulders and the second hook portions engage respectively the first hook portions.

When the second hook portions 551 are moved upwardly past the first hook portions 512, they are biased to return to their original positions due to the returning force of the arms 550, as shown in FIGS. 10 and 11, so as to engage the second hook portions 551 with the first hook portions 512. At the same time, the guiding stubs 549 separate from the inclined bottom wall surfaces 527 to thereby return to their original positions due to the returning force of the arms 548. Hence, the guiding stubs 549 abut respectively against the stop shoulders 524. At this time, the fastening device 5 is in a locking state, so that the first article 3 is fastened to the second article 4. In this embodiment, the two second hooks 54 are orientated in different directions, and engage respectively the two first hook portions 512 of the first hook 51. When an external force is applied to the first article 3 such that one of the second hook portions 551 is pushed or pulled and, thus, deformed to thereby separate from the corresponding first hook portion 512, since the other of the second hook portions 551 still engages the corresponding first hook portion 512, removal of the first hook 51 from the second hooks 52 can be prevented to thereby maintain stably the fastening device 5 in the locking state.

Figure 12:
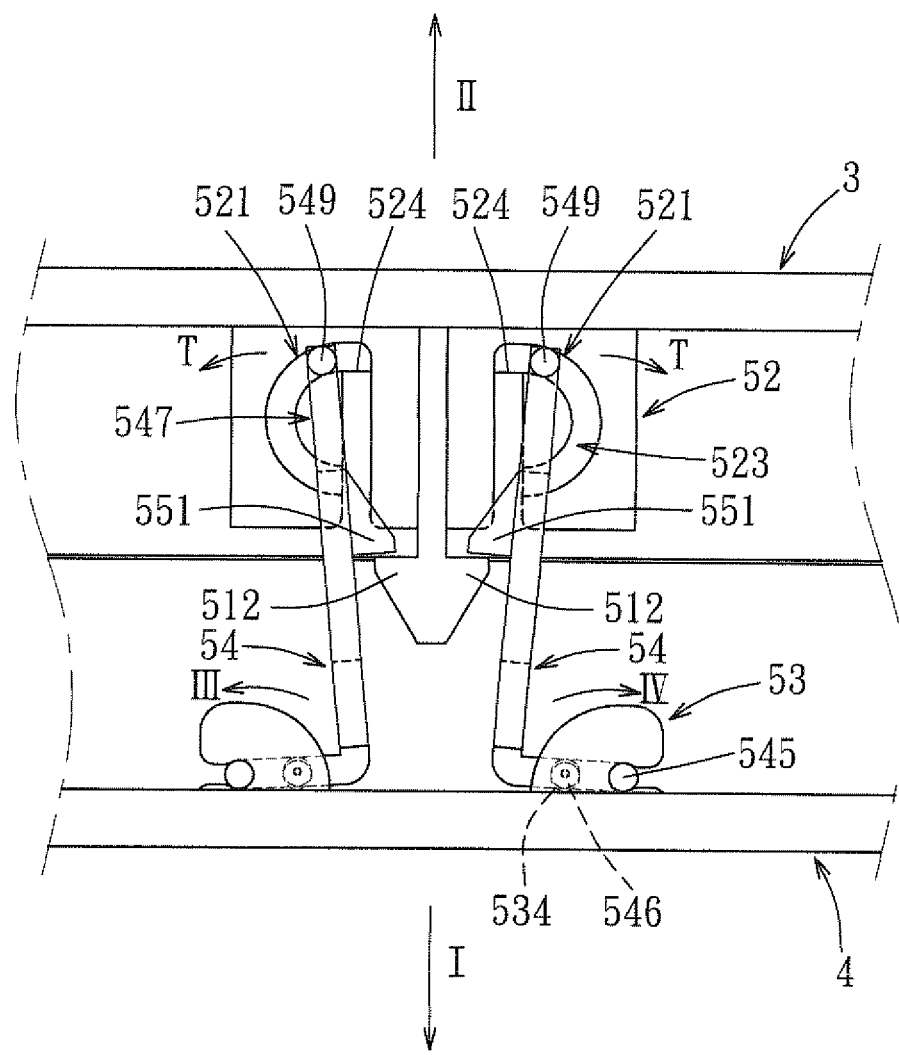
FIG. 12 is a fragmentary schematic view of the fastening device of the preferred embodiment, illustrating movement of the guiding stubs along two curved guiding slot portions, respectively.

Referring to FIG. 12, when it is desired to separate the first and second articles 3, 4 from each other, the first article 3 is pulled upwardly in the second direction (II), and/or the second article 4 is pulled downwardly in the first direction (I) to move the first and second articles 3, 4 from each other. Hence, the guiding stubs 549 of the guiding rods 547 are guided by the stop shoulders 524 into the curved guiding slot portions 523 to move away from each other. At the same time, two torques (T) are applied respectively by the positioning plates 52 to the second hooks 54 in opposite rotational directions. The torques (T) are sufficient large to remove the second positioning portions 546 from the first positioning portions 534 to thereby pivot the second hooks 54 away from each other. As a result, the second hook portions 551 are removed from the first hook portions 512, respectively.

Figure 13:
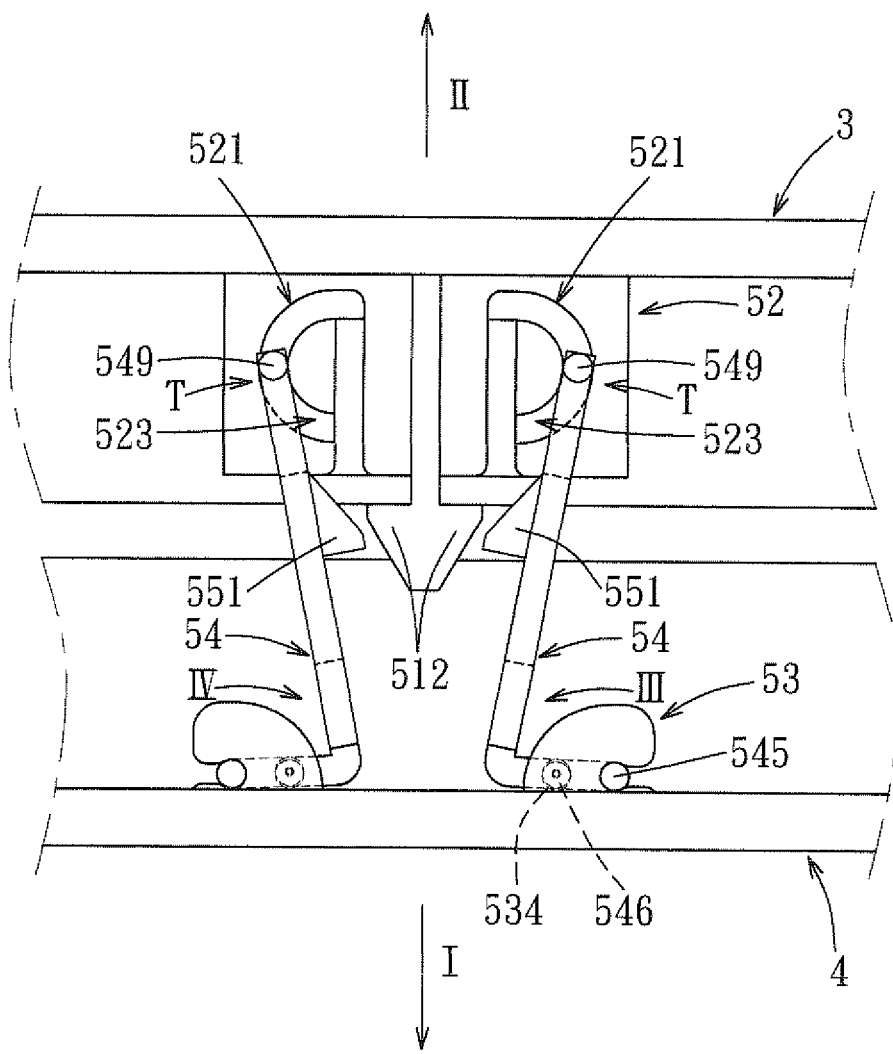
FIG. 13 is a fragmentary schematic view of the fastening device of the preferred embodiment, illustrating that each of the guiding stubs is disposed at a position of the corresponding curved slot portion distal from the corresponding upright slot portion to allow the first hook portions to move past the second hook portions.
Figure 14:
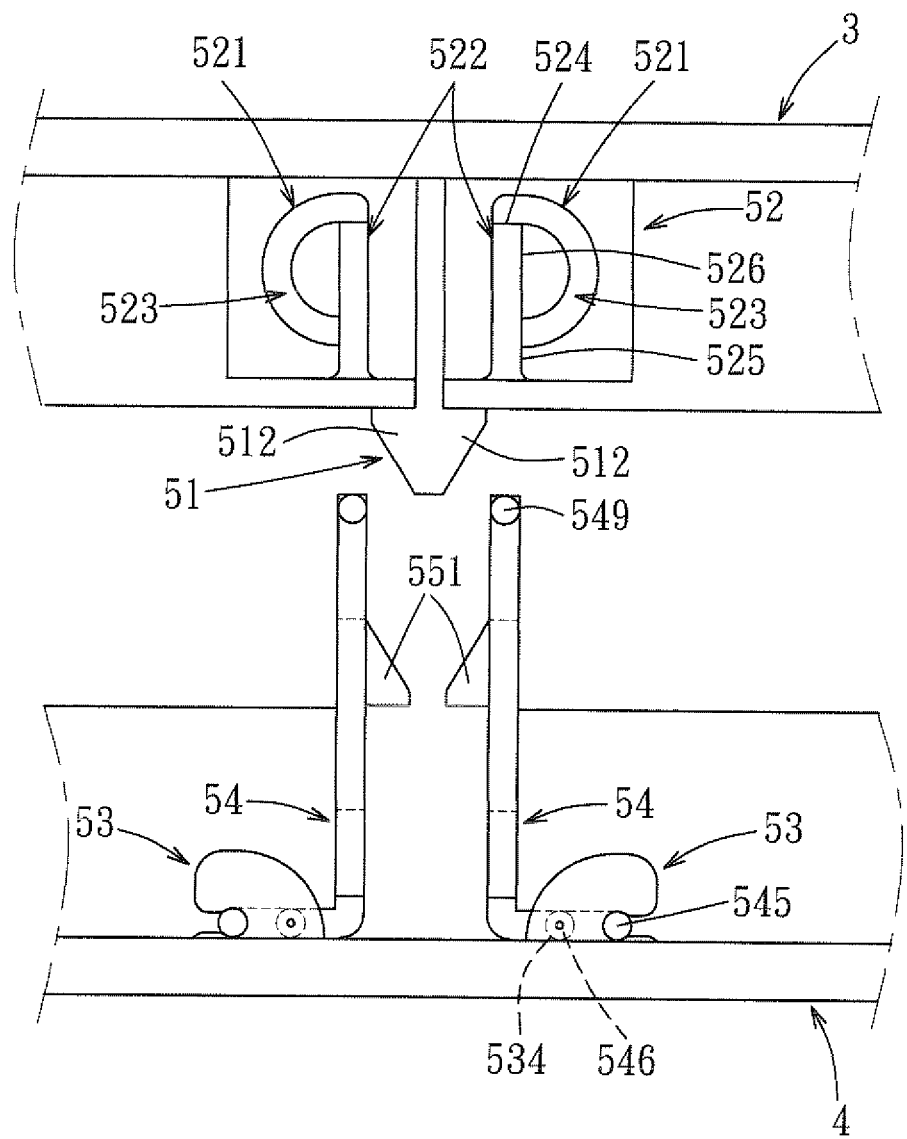
FIG. 14 is a fragmentary schematic view of the fastening device of the preferred embodiment, illustrating that the first article is removed from the second article.

With particular reference to FIG. 13, when the guiding stubs 549 move to the outmost positions of the curved guiding slot portions 523, the second hook portions 551 of the second hooks 54 are spaced apart from each other by a maximum distance, which allows for passage of the first hook 51 through a space between the second hook portions 551. Since the second hook portions 551 are not obstructed by the first hook portions 512, they can be removed easily from the first hook portions 512.

With reference to FIG. 13, when the guiding stubs 549 move downwardly from the outmost positions of the curved guiding slot portions 523, two torques (T) are applied respectively by the positioning plates 52 to the second hooks 54, so as to pivot the second hooks 54 toward each other. When the guiding stubs 549 move to the main slot sections 525 of the upright slot portions 522, the second positioning portions 546 of the second hooks 54 engage respectively the first positioning portions 534 to return the second hooks 54 to their original positions. At this time, the fastening device 5 is in a release state, so that the guiding stubs 549 can be separated from the main slot sections 525. That is, the first article 3 is removed from the second article 4.

Alternatively, the fastening device 5 may include only one first hook portion 512, only one pair of fixed plates 53, and only one second hook 54, and each of the positioning plates 52 may include only one positioning guide track 521. In this state, the fastening device 5 is also changeable between the locking state and the release state.

With this invention thus explained, it is apparent that numerous modifications and variations can be made without departing from the scope and spirit of this invention. It is therefore intended that this invention be limited only as indicated by the appended claims.

We claim:

1. A fastening device adapted to fasten a first article to a second article, said fastening device comprising:

a first hook adapted to be disposed on the first article and having at least one inclined surface;

two positioning plates adapted to be disposed on the first article and respectively located in front of and behind said first hook, each of said positioning plates including at least one positioning guide track, said positioning guide track of each of said positioning plates including an upright slot portion having an open bottom end and defined by an inclined bottom wall surface, a curved guiding slot portion having top and bottom ends in spatial communication with said upright slot portion and located at a side of said upright slot portion distal from said first hook, and a stop shoulder disposed between a top end of said upright slot portion and said top end of said curved guiding slot portion;

at least one pair of fixed plates spaced apart from each other in a front-to-rear direction and adapted to be disposed on the second article, each of said fixed plates including a first positioning portion; and at least one second hook including an upright plate body connected pivotally between each pair of said fixed plates, a hook body extending from a top end of said plate body and engaging removably said first hook, two guiding rods extending from said top end of said plate body and spaced apart from and respectively located in front of and behind said hook body, said hook body having an inclined surface, and two second positioning portions extending from a lower end of said plate body and engaging respectively and removably said first positioning portions of said fixed plates so as to prevent rotation of said second hook relative to said fixed plates, each of said guiding rods including a guiding stub that extends from an upper end thereof, that abuts against said stop shoulder of a respective said positioning guide track of a corresponding one of said positioning plates, and that is inserted into and guided by said upright slot portion of said positioning guide track of the corresponding one of said positioning plates to abut against said stop shoulder of a respective said positioning guide track of the corresponding one of said positioning plates during assembly of a corresponding one of said guiding rods to the corresponding one of said positioning plates, wherein when the first and second articles are operated to move toward each other, said guiding stubs of said guiding rods of said second hook move respectively into said upright slot portions through said open bottom ends and on said inclined bottom wall surfaces, such that said inclined surfaces of said first and second hooks move on each other to flex said guiding rods relative to said upright slot portions to thereby allow said inclined surfaces of said first and second hooks to move past each other, wherein when the first and second articles are operated to separate from each other, said guiding stubs of said guiding rods of said second hook move respectively from said upright slot portions of said positioning guide tracks of said positioning plates into said curved slot portions of said positioning guide tracks of said positioning plates, and then move respectively along said curved slot portions of said positioning guide tracks of said positioning plates to pivot said plate body and, thus, said guiding stubs relative to said fixed plates, so as to disengage said second positioning portions from said first positioning portions, respectively, to thereby pivot and separate said hook body of said second hook from said first hook.

2. The fastening device as claimed in claim 1, wherein said inclined bottom wall surface of each of said upright slot portions of said positioning guide tracks is inclined upwardly and inwardly toward said first hook and permits the corresponding one of said guiding stubs to move thereon.

3. The fastening device as claimed in claim 2 wherein each of said upright slot portions of said positioning guide tracks further has a main slot section that is open at a bottom end thereof and that is in spatial communication with said bottom end of said curved guiding slot portion of a corresponding one of said positioning guide tracks, and a guiding slot section that extends upwardly from a top end of said main slot section and that has a top end in spatial communication with said top end of said curved guiding slot portion of the corresponding one of said positioning guide tracks.

4. The fastening device as claimed in claim 3, wherein said first hook includes at least one first hook portion disposed at a bottom end thereof, said plate body of each said second hook being L-shaped and having an upright plate portion, said hook body of said second hook including an arm extending from a top end of said upright plate portion, and a second hook portion engaging a respective said first hook portion of said first hook, said guiding stubs being above said second hook portion of said second hook.

5. The fastening device as claimed in claim 4, wherein said hook body of each said second hook further has a horizontal stop plate portion adapted to abut against the second article, each of said fixed plates including a pivot groove, said second hook further including two pivot shafts disposed on said stop plate portion and received respectively and rotatably within said pivot grooves in a respective pair of said fixed plates.

6. The fastening device as claimed in claim 5, wherein said pivot groove in each of said fixed plates has a pivoting groove portion that permits a corresponding one of said pivot shafts to be received therein, and a guiding groove portion that is open in a left-to-right direction so as to guide the corresponding one of said pivot shafts into said pivoting groove portion therethrough during assembly of said fastening device.

7. The fastening device as claimed in claim 5, wherein said first positioning portion of each of said fixed plates is configured as one of a circular groove and a cylindrical tongue, each of said second positioning portions of said second hook being configured as the other of said circular groove and said cylindrical tongue.

8. The fastening device as claimed in claim 4, wherein said first hook includes two said first hook portions, each of said positioning plates including two said positioning guide tracks located respectively at opposing sides of said first hook and spaced apart from each other in a left-to-right direction, said fastening device including two pairs of said fixed plates, and two said second hooks engaging respectively said first hook portions, each pair of said fixed plates being spaced apart from each other in the front-to-rear direction, said second hooks being removable from said first hook portions, respectively, by guidance of said positioning guide tracks, respectively.

9. An object comprising:
a first article;
a second article; and
a fastening device for fastening said first article to said second article, said fastening device including:
  a first hook disposed on said first article and having at least one inclined surface,
  two positioning plates disposed on said first article and respectively located in front of and behind said first hook, each of said positioning plates including at least one positioning guide track, said positioning guide track of each of said positioning plates including an upright slot portion having an open bottom end and defined by an inclined bottom wall surface, a curved guiding slot portion having top and bottom ends in spatial communication with said upright slot portion and located at a side of said upright slot portion distal from said first hook, and a stop shoulder disposed between a top end of said upright slot portion and said top end of said curved guiding slot portion,
  at least one pair of fixed plates spaced apart from each other in a front-to-rear direction and disposed on said second article, each of said fixed plates including a first positioning portion, and
  at least one second hook including an upright plate body connected pivotally between each pair of said fixed plates, a hook body extending from a top end of said plate body and engaging removably said first hook, two guiding rods extending from said top end of said plate body and spaced apart from and respectively located in front of and behind said hook body, said hook body having an inclined surface, and two second positioning portions extending from a lower end of said plate body and engaging respectively and removably said first positioning portions of said fixed plates so as to prevent rotation of said second hook relative to said fixed plates, each of said guiding rods including a guiding stub that extends from an upper end thereof, that abuts against said stop shoulder of a respective said positioning guide track of a corresponding one of said positioning plates, and that is inserted into and guided by said upright slot portion of said positioning guide track of the corresponding one of said positioning plates to abut against said stop shoulder of a respective said positioning guide track of the corresponding one of said positioning plates during assembly of a corresponding one of said guiding rods to the corresponding one of said positioning plates, wherein when the first and second articles are operated to move toward each other, said guiding stubs of said guiding rods of said second hook move respectively into said upright slot portions through said open bottom ends and on said inclined bottom wall surfaces, such that said inclined surfaces of said first and second hooks move on each other to flex said guiding rods relative to said upright slot portions to thereby allow said inclined surfaces of said first and second hooks to move past each other, wherein when the first and second articles are operated to separate from each other, said guiding stubs of said guiding rods of said second hook move respectively from said upright slot portions of said positioning guide tracks of said positioning plates into said curved slot portions of said positioning guide tracks of said positioning plates, and then move respectively along said curved slot portions of said positioning guide tracks of said positioning plates to disengage said second positioning portions from said first positioning portions, respectively, to thereby pivot and separate said hook body of said second hook from said first hook.

10. The object as claimed in claim 9, wherein said inclined bottom wall surface of each of said upright slot portions of said positioning guide tracks is inclined upwardly and inwardly toward said first hook and permits the corresponding one of said guiding stubs to move thereon.

11. The object as claimed in claim 10, wherein each of said upright slot portions of said positioning guide tracks further has a main slot portion that is open at a bottom end thereof and that is in spatial communication with said bottom end of said curved guiding slot portion of a corresponding one of said positioning guide tracks, and a guiding slot portion that extends upwardly from a top end of said main slot portion and that has a top end in spatial communication with said top end of said curved guiding slot portion of the corresponding one of said positioning guide tracks.

12. The object as claimed in claim 11, wherein said first hook includes at least one first hook portion disposed at a bottom end thereof, said plate body of each said second hook being L-shaped and having an upright plate portion, said hook body of said second hook including an arm extending from a top end of said upright plate portion, and a second hook portion engaging a respective said first hook portion of said first hook, said guiding stubs being above said second hook portion of said second hook.

13. The object as claimed in claim 12, wherein said hook body of each said second hook further has a horizontal stop plate portion abutting against said second article, each of said fixed plates including a pivot groove, said second hook further including two pivot shafts disposed on said stop plate portion and received respectively and rotatably within said pivot grooves in a respective pair of said fixed plates.

14. The object as claimed in claim 13, wherein said pivot groove in each of said fixed plates has a pivoting groove portion that permits a corresponding one of said pivot shafts to be received therein, and a guiding groove portion that is open in a left-to-right direction so as to guide the corresponding one of said pivot shafts into said pivoting groove portion therethrough during assembly of said object.

15. The object as claimed in claim 14, wherein said first positioning portion of each of said fixed plates is configured as one of a circular groove and a cylindrical tongue, each of said second positioning portions of said second hook being configured as the other of said circular groove and said cylindrical tongue.

16. The object as claimed in claim 12, wherein said first hook includes two said first hook portions, each of said positioning plates including two said positioning guide tracks located respectively at opposing sides of said first hook and spaced apart from each other in a left-to-right direction, said fastening device including two pairs of said fixed plates, and two said second hooks engaging respectively said first hook portions, each pair of said fixed plates being spaced apart from each other in the front-to-rear direction, said second hooks being removable from said first hook portions, respectively, by guidance of said positioning guide tracks, respectively.

* * * * *